US012335300B1

(12) United States Patent
Nandan et al.

(10) Patent No.: US 12,335,300 B1
(45) Date of Patent: Jun. 17, 2025

(54) RULES GENERATION TO PRIORITIZE COMPUTER NETWORK DEVICES

(71) Applicant: CrowdStrike, Inc., Sunnyvale, CA (US)

(72) Inventors: Manu Nandan, Frisco, TX (US);
Michael Brautbar, Wayland, MA (US);
Hariprasad Holla, Fremont, CA (US);
Stephen Kennedy, Westminster, CO (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/647,422

(22) Filed: Apr. 26, 2024

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/145* (2013.01)

(58) Field of Classification Search
CPC .......... G06N 3/045; G06N 3/08; G06N 20/00; G06N 3/088; G06N 3/044; G06N 3/047; G06F 16/5838; G06F 18/24; G06F 16/583; G06F 16/9535; G06F 40/30; G06F 16/24578; G06F 16/532; H04L 63/1425; H04L 63/1466; H04L 63/1491; H04L 63/1433
USPC .......... 726/22, 2, 21, 36; 713/150, 163, 181; 380/255, 264, 276
See application file for complete search history.

(56) References Cited

U.S. PATENT DOCUMENTS

| | | | | |
|---|---|---|---|---|
| 9,195,912 B1* | 11/2015 | Huang | ............ | G06F 16/51 |
| 9,220,012 B1* | 12/2015 | Inamdar | ............ | H04L 63/108 |
| 9,998,284 B2* | 6/2018 | Zimmer | ............ | G06F 9/28 |
| 10,756,898 B2* | 8/2020 | Puentes | ............ | H04L 9/3247 |
| 11,068,281 B2* | 7/2021 | McMullen | ............ | H04L 69/40 |
| 11,621,976 B2* | 4/2023 | El-Moussa | ............ | G06N 20/00 |
| | | | | 726/23 |
| 2013/0219168 A1* | 8/2013 | Gearhart | ............ | H04L 63/0471 |
| | | | | 713/153 |
| 2014/0222813 A1* | 8/2014 | Yang | ............ | G06F 16/95 |
| | | | | 707/736 |
| 2014/0281477 A1* | 9/2014 | Nayshtut | ............ | H04L 9/0825 |
| | | | | 713/150 |
| 2014/0373116 A1* | 12/2014 | Hajduczenia | ............ | H04L 63/083 |
| | | | | 726/6 |
| 2016/0112203 A1* | 4/2016 | Thom | ............ | H04L 9/3247 |
| | | | | 713/176 |

(Continued)

FOREIGN PATENT DOCUMENTS

JP  2020524870 A  8/2020

*Primary Examiner* — Sharif E Ullah
(74) *Attorney, Agent, or Firm* — Womble Bond Dickinson (US) LLP

(57) ABSTRACT

The present disclosure provides an approach of generating a target feature vector based on information corresponding to a target entity. The target entity utilizes a target system that includes a target asset. The approach matches the target feature vector to a compatible entity cluster from a plurality of entity clusters. The compatible entity cluster corresponds to a current entity system. The approach generates a target asset prioritization rule based on prioritization information of the current entity system. In turn, the approach prompts the target system to assign a prioritization label to the target asset based on the target asset prioritization rule.

17 Claims, 6 Drawing Sheets

(56) References Cited

U.S. PATENT DOCUMENTS

| | | | |
|---|---|---|---|
| 2016/0182499 A1* | 6/2016 | Sharaga | G06F 21/82 |
| | | | 713/156 |
| 2016/0277933 A1* | 9/2016 | Moon | H04W 12/04 |
| 2016/0308677 A1* | 10/2016 | Thom | H04L 9/3234 |
| 2016/0352516 A1* | 12/2016 | Oberheide | H04L 9/0897 |
| 2017/0111373 A1* | 4/2017 | Morton | H04L 63/126 |
| 2017/0177449 A1* | 6/2017 | Bronk | H04W 4/70 |
| 2017/0262633 A1* | 9/2017 | Miserendino | G06N 5/025 |
| 2017/0289943 A1* | 10/2017 | Zhao | H04W 4/08 |
| 2018/0139219 A1* | 5/2018 | Sabata | H04L 41/06 |
| 2018/0375892 A1* | 12/2018 | Ganor | G06Q 10/0635 |
| 2020/0382547 A1* | 12/2020 | Basballe Sorensen | |
| | | | H04L 63/1433 |
| 2021/0240825 A1* | 8/2021 | Kutt | G06F 21/563 |
| 2021/0240826 A1* | 8/2021 | Kutt | G06N 20/00 |
| 2021/0336781 A1* | 10/2021 | Jia | H04L 63/04 |
| 2021/0352051 A1* | 11/2021 | Schmitt | H04L 9/006 |
| 2021/0366006 A1* | 11/2021 | Zhong | G06F 16/9535 |
| 2022/0158944 A1* | 5/2022 | Hansen | H04L 47/24 |

\* cited by examiner

RULES GENERATION TO PRIORITIZE COMPUTER NETWORK DEVICES

TECHNICAL FIELD

Aspects of the present disclosure relate to prioritizing computer network assets, and more particularly, to generating prioritization rules for a target entity based on prioritization information from similar entities.

BACKGROUND

Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware. Additionally, cybersecurity threats also encompass suspicious activities, such as unusual patterns of network traffic or unauthorized access attempts, which may indicate potential security breaches or weaknesses that need investigation and mitigation.

Prioritizing computer network assets based on their importance is essential to strengthen an entity's cybersecurity posture. Assets that serve as the main gateways to the network, such as firewalls and routers, demand immediate and rigorous security measures due to their role in controlling incoming and outgoing traffic, effectively acting as the first line of defense against external threats. Following closely are the servers, especially those hosting sensitive data or critical applications, as breaches involving these can have devastating consequences, ranging from data loss to operational disruption. Workstations and user devices, while individually less impactful, collectively represent a significant risk due to their number and the potential for human error, necessitating robust endpoint protection and user education. This tiered approach to cybersecurity, with emphasis on devices critical to network integrity and business operations, ensures resources are allocated efficiently, thereby maximizing the network's resilience against cyber-attacks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
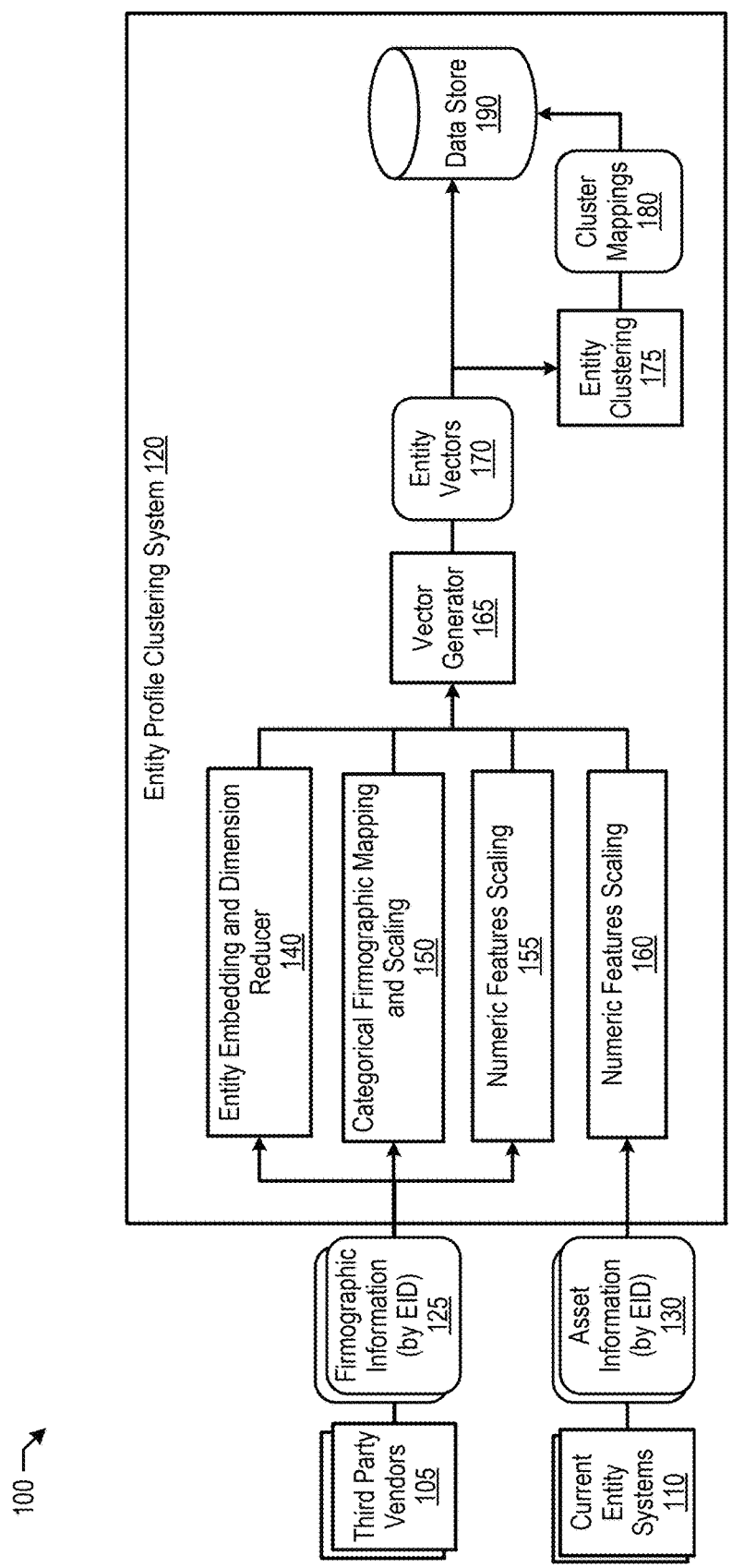
FIG. 1 is a block diagram that illustrates an example system for generating entity vectors and clustering the entity vectors into entity clusters, in accordance with some embodiments of the present disclosure.

As discussed above, prioritizing computer network assets based on their importance is essential to strengthen an entity's cybersecurity posture. Entities with computer assets attempt to identify which of their assets should be considered "critical" in order to prioritize risk management and incident response to combat cyber threats. A challenge found is in the substantial number of computer assets an entity may have, numbering in the hundreds of thousands for large corporations, from portable phones, laptops, desktop computers, servers, etc. Manually identifying the most important of these assets is cumbersome, and, considering the dynamic nature of these assets where assets can be created in a short period of time, it is even more difficult to dynamically maintain such a list.

Another challenge found is that current solutions rely on manually tagging important assets and using the tags or other information about assets to identify the most important assets. Network security team members typically use search capabilities provided in network security software solutions to shortlist assets that have specific tags or satisfy some other conditions, such as running a version of an operating system (OS). This relies heavily on the quality of the tags given to the assets and also requires the network security teams to constantly be aware of any changes in the threat landscape so that their systems are protected in a timely fashion.

Yet another challenge found is that some solutions automatically label some types of assets as important, based on static rules, for example, a rule can label all file servers as important. However, these solutions do not capture all assets that should be prioritized. For example, after identifying a vulnerability in a version of an operating system (OS), all assets running that OS version that are directly connected to the Internet may need to be prioritized for protection from cyber-attacks until the vulnerability is resolved. Such events are dynamic and require solutions that can respond quickly, and static rule based solutions are typically not able to adapt to such a scenario.

The present disclosure addresses the above-noted and other deficiencies by automatically generating target asset prioritization rules for a target entity based on prioritization information from similar entities. The present disclosure groups similar entities into clusters, computes inferred rules based on asset tags and prioritization labels assigned by entities to their entity assets, and uses the inferred rules with generated rules from the entities to generate target asset prioritization rules.

In one embodiment, the approach uses a processing device to generate a target feature vector based on information corresponding to a target entity. The target entity utilizes a target system that includes a target asset. The processing device matches the target feature vector to a compatible entity cluster from a plurality of entity clusters, wherein the compatible entity cluster corresponds to a current entity system. The processing device generates a target asset prioritization rule based on prioritization information of the current entity system. In turn, the processing device prompts the target system (e.g., sends a request to the target system) to assign a prioritization label to the target asset based on the target asset prioritization rule.

In one embodiment, the processing device collects, from the prioritization information, an assigned asset tag and an assigned prioritization label, one or both of which may be manually assigned. The processing device formats the assigned asset tag and the assigned prioritization label into an assigned asset tag embedding and an assigned prioritization label embedding. The processing device generates an inferred rule from the assigned asset tag embedding and the assigned prioritization label embedding. Then, in response to matching the target feature vector to the compatible entity cluster, the processing device utilizes the inferred rule to generate the target asset prioritization rule.

In one embodiment, the processing device provides the assigned asset tag embedding and the assigned prioritization label embedding to an artificial intelligence (AI) model that is trained to produce readable prioritization rules. In turn, the processing device uses the AI model to produce the inferred rule.

In one embodiment, the compatible entity cluster includes the EID. The processing device collects, from the prioritization information, at least one generated rule that corresponds to the EID. In response to matching the target cluster vector to the compatible entity cluster, the processing device utilizes the at least one generated rule and at least one of the plurality of inferred rules in the generating of the target asset prioritization rule.

In one embodiment, the information comprises at least one of firmographic information or asset information, the firmographic information comprising at least one of an industry type, an entity size, or an entity location, and the asset information comprising at least one of an asset type or an asset quantity. In one embodiment, the processing device collects the firmographic information and the asset information corresponding to a plurality of entities. The processing device generates a plurality of entity vectors based on the firmographic information and the asset information. In turn, the processing device maps the plurality of entity vectors to produce the plurality of entity clusters.

In one embodiment, the target asset prioritization rule comprises an assigned asset tag corresponding to the target asset and the prioritization label indicates a priority at which to protect the target asset against malware.

As discussed herein, the present disclosure provides an approach that improves the operation of a computer system by automatically generating prioritization rules for a target entity based on prioritization information generated by similarly clustered entities. This approach facilitates the dynamic identification and prioritization of critical computer network assets, thereby enhancing an entity's cybersecurity posture amidst the complexity of managing substantial numbers of assets and the dynamic nature of cyber threats. In addition, the present disclosure provides an improvement to the technological field of cybersecurity by identifying and prioritizing critical assets based on learned behavior from similar entities, thus overcoming current limitations of manual tagging and static rule-based solutions that fail to adapt to the evolving threat landscape.

FIG. 1 is a block diagram that illustrates an example system for generating entity vectors and clustering the entity vectors into entity clusters, in accordance with some embodiments of the present disclosure. System 100 builds numerical vector representations of entity profiles and uses the numerical vector representations to cluster entities, such as by their industry type (e.g., financial, insurance, technology, etc.), entity size, geographic location, etc. In one embodiment, entity profile clustering system 120 executes on a periodic basis, such as bi-weekly, to update entity vectors 170 and cluster mappings 180.

Third party vendors 105 (e.g., market research firms) provide firmographic information 125 to entity profile clustering system 120, which is organized according to entity ID (EID). Firmographic information 125, in one embodiment, may be in free form text based on third-party formatting and include characteristics that provide information about the entity. For example, firmographic information 125 may include information about the entity such as industry, size, location, revenue, number of employees, and other relevant organizational attributes to identify a entity type (e.g., large financial company, mid-size insurance company, etc.).

Firmographic information 125 feeds into entity embedding and dimension reducer 140. Entity embedding and dimension reducer 140 uses available data from firmographic information 125 to compute embeddings of the entity verticals for each EID with as much detail of the entity as possible. In one embodiment, an entity vertical from each third party vendor 105 is concatenated to form sentences, which may be passed to a pre-trained natural language processing (NLP) model that generates embeddings representing input sentences. For example, a universal-encoder-model may be used to create 768 dimensional embeddings for each input. Then, entity embedding and dimension reducer 140 reduces the dimensional embeddings, such as by using principal component analysis (PCA). Principal Component Analysis (PCA) is a statistical technique used to reduce the dimensions of a dataset while retaining as much of the original information as possible, by transforming the data into a new set of uncorrelated variables (principal components) having 32 dimensions.

In one embodiment, all, or portions of, entity embedding and dimension reducer 140 may be implemented using an artificial intelligence (AI) model. AI models include machine learning models, large language models, and other types of models that are based on neural networks, genetic algorithms, expert systems, Bayesian networks, reinforcement learning, decision trees, or combination thereof. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve highly sophisticated language understanding and generation capabilities.

Firmographic information 125 also feeds into categorical firmographic mapping and scaling 150, which processes other firmographic information in firmographic information 125, such as a geographic region corresponding to an entity's country (USA=>North America); the number of employees and the annual revenue in USD; etc. In one embodiment, the other firmographic information has low cardinality, and is therefore encoded using, for example, one hot encoding. One hot encoding is a process that represents categorical data by creating binary vectors where each vector element corresponds to a specific category and has a value of "1" if the category is present and "0" otherwise.

Firmographic information 125 also feeds into numeric features scaling 155. Numeric features scaling 155 performs arithmetic transformations of each feature so that each feature has values of the same range (e.g., from 0 to 1).

Without such scaling, for example, one feature (e.g., revenue feature) may have a range (e.g., millions of dollars) orders of magnitude more than the size of the entity (e.g., 100 employees) and therefore dominating the clustering results. By scaling each feature to a range of 0-1, each features has equal importance during clustering. In one embodiment, numeric features scaling 155 may apply a weighting factor to features that are determined to be more important than other features.

Current entity systems 110 provide asset information 130 to entity profiling clustering system 120 according to EID. Asset information 130 includes information about an entity's computer assets, such as the number of managed assets in a EID, Internet facing hosts, Windows/Linux machines, domain controllers/servers/workstations, and categories of applications installed on the entity assets. Asset information 130 may be used to identify entities that are similar to a target entity in terms of their network and asset information (e.g., large corporation, small entity, etc.). Asset information 130 feeds into numeric features scaling 160, which performs arithmetic transformations of each feature so that each feature has values of the same range similar to numeric features scaling 155 discussed above.

Vector generator 165 creates entity vectors 170 for each entity (EID) based on outputs from entity embedding and dimension reducer 140, categorical firmographic mapping and scaling 150, numeric features scaling 155, and numeric features scaling 160. Entity profile clustering system 120 stores entity vectors 170 in data store 190 and also feeds entity vectors 170 to entity clustering 175. Entity clustering 175 uses entity vectors 170 to identify similar entities by finding those with less difference in their numerical representation (entity vector). For example, entity clustering 175 may compute clusters of similar entities using a k-means algorithm. In turn, entity vectors 170 and cluster mappings 180 are subsequently utilized to identify a cluster corresponding to a target entity and generate a list of prioritization rules for the target entity accordingly (see FIG. 3 and corresponding text for further details).

Figure 2:
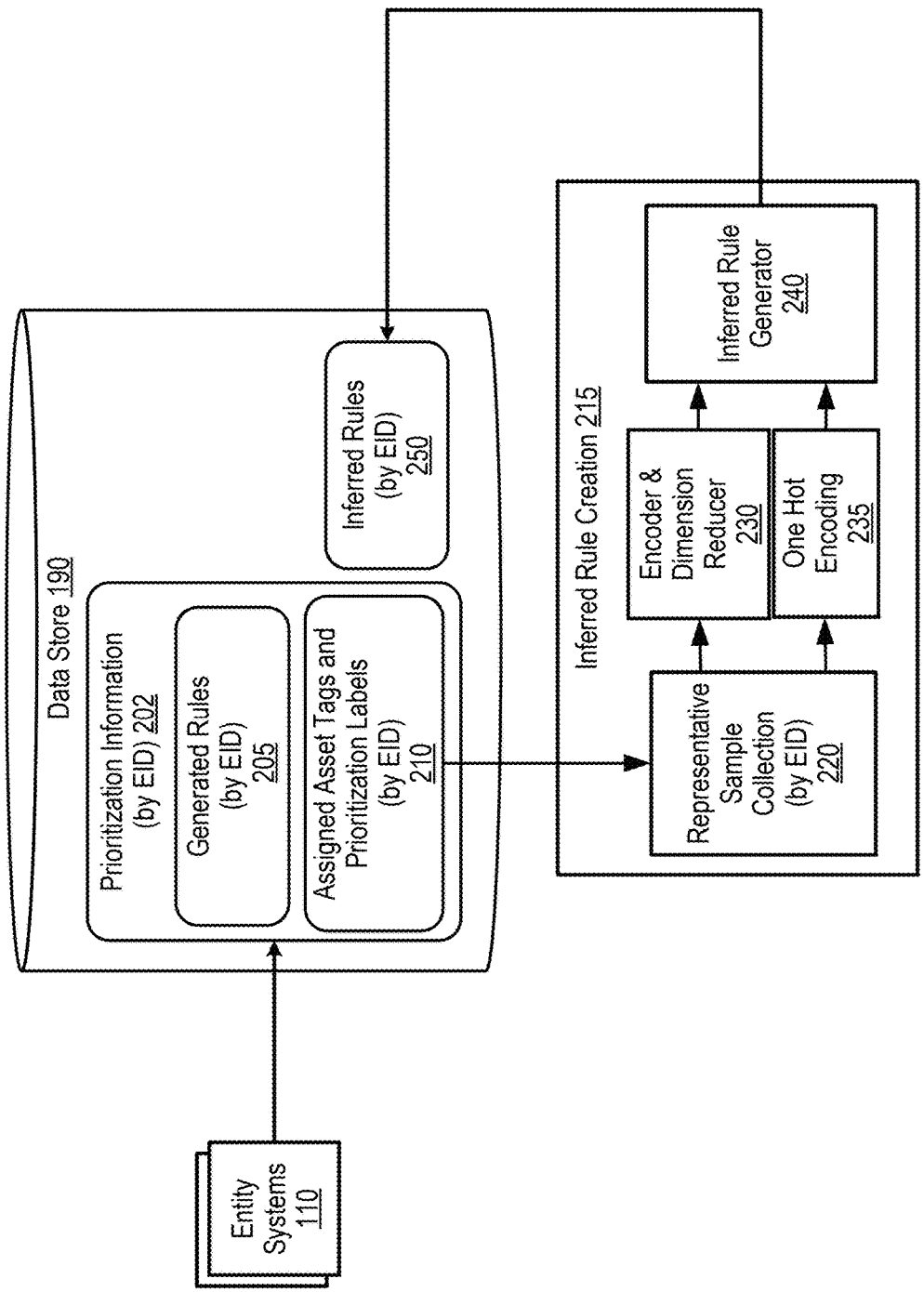
FIG. 2 is a block diagram that illustrates an example system that generates inferred rules from assigned asset tags with corresponding assigned prioritization labels, in accordance with some embodiments of the present disclosure.

FIG. 2 is a block diagram that illustrates an example system that generates inferred rules from assigned asset tags with corresponding assigned prioritization labels, in accordance with some embodiments of the present disclosure.

Users of current entity systems 110 have the option to create prioritization information 202 for their system, which includes generated rules 205 (e.g., manually generated rules), and assigned asset tags and prioritization labels 210. In one embodiment, the assigned asset tags are free form text that correspond to the asset (e.g., "SQL server"), and the prioritization rules may reference the tags (e.g., "if tag=SQL server . . . "). The labels are indicators of criticality (e.g., high, medium, low), and the prioritization rules may add labels to the assets accordingly (e.g., " . . . then assign HIGH label to asset"). For example, a user may generate a rule that places a high prioritization on assets that include an "SQL server" tag, which may also be assigned. In another example, a user may assign a prioritization label to an asset, such as when the user knows there is some critical functionality supported by the asset (e.g., a particular server).

In some embodiments, tag assignments allow users to not just create rules to build upon, but also to create lists of assets that require a critical patch (e.g., tagged as 'patch_asap'). In some embodiments, tag nomenclature may vary between current entity systems 110. For example, some current entity systems 110 may use a label of "SQLServer" while other current entity systems 110 may use a label of "Server: SQL." In some embodiments, a generated rule 205 may include multiple conditions. For example, the rule may be:

IF 'SQLServer' IN tags AND product_type_desc=='Server' AND os_version=='Windows Server 2019' THEN criticality=High.

System 200 includes inferred rule creation 215, which collects assigned asset tags and prioritization labels 210 to generate inferred rules 250. Inferred rule creation 215 uses representative sample collection 220 to sort through assigned asset tags and prioritization labels 210 and select, based on the EID, those assets having assigned asset tags and prioritization labels. In one embodiment, to use applications executing on an asset as a feature for rule generation, representative sample collection 220 performs some processing to filter out some applications because there are typically too many applications running in each asset and inferred rule creation 215 will not produce meaningful rules due to the very high dimensional space. In addition, representative sample collection 220 identifies applications that are common between EIDs. Furthermore, the selected applications should be characteristic of their corresponding assets and not generic applications (e.g., MS Paint). In one embodiment, to identify the special applications, representative sample collection 220 may use the following formula to compute a score:

$$\text{score} = [C1 * (1 - N1) + C2 * (1 - N2)] / A1, \text{ where}$$

$C1 = \%$ of *EIDs* that have app installed in Critical or High assets;

$C2 = \%$ of Critical or High assets that have app installed;

$N1 = \%$ of *EIDs* that have app installed in Noncritical assets;

$N2 = \%$ of Critical or High assets that have app installed; and $A1 = \%$ of all assets including unassigned that have app installed.

Representative sample collection 220 feeds the assigned tags and their corresponding assigned prioritization labels into encoder and dimension reducer 230. Encoder and dimension reducer 230 may include a pre-trained sentence encoder model that, for each input, generates a large number of embeddings (e.g., 768), which encoder and dimension reducer 230 then reduces to 32 dimensions (e.g., using PCA as described earlier). Representative sample collection 220 provides other features having low cardinality to one-hot encoding 235. One-hot encoding 235 is a process that represents categorical data by creating binary vectors where each vector element corresponds to a specific category and has a value of "1" if the category is present and "0" otherwise.

Then, the outputs of encoder and dimension reducer 230 and one-hot encoding 235 feed into inferred rule generator 240. Inferred rule generator 240 may use a machine learning technique that combines the power of traditional regression models with the interpretability of decision rules. In one embodiment, inferred rule generator 240 uses a two-step process where decision trees are first trained to capture complex interactions, and then linear regression is applied to incorporate the important rules extracted from the trees. In turn, inferred rule generator 240 provides a balance between predictive accuracy and comprehensibility, making it useful for tasks where interpretability is essential. In one embodiment, inferred rule generator 240 may be an AI model. AI models include machine learning models, large language models, and other types of models that are based on neural networks, genetic algorithms, expert systems, Bayesian networks, reinforcement learning, decision trees, or combination thereof.

In one embodiment, to ensure that the inferred rules are not complicated for human readers, a small set of features may be used by inferred rule generator 240 to generate the rules such as: Asset tags, Asset platform (windows/Linux/Max), Asset product type (Server/Domain-Controller), Asset applications data, Asset internet exposure, or a combination thereof.

Figure 3:
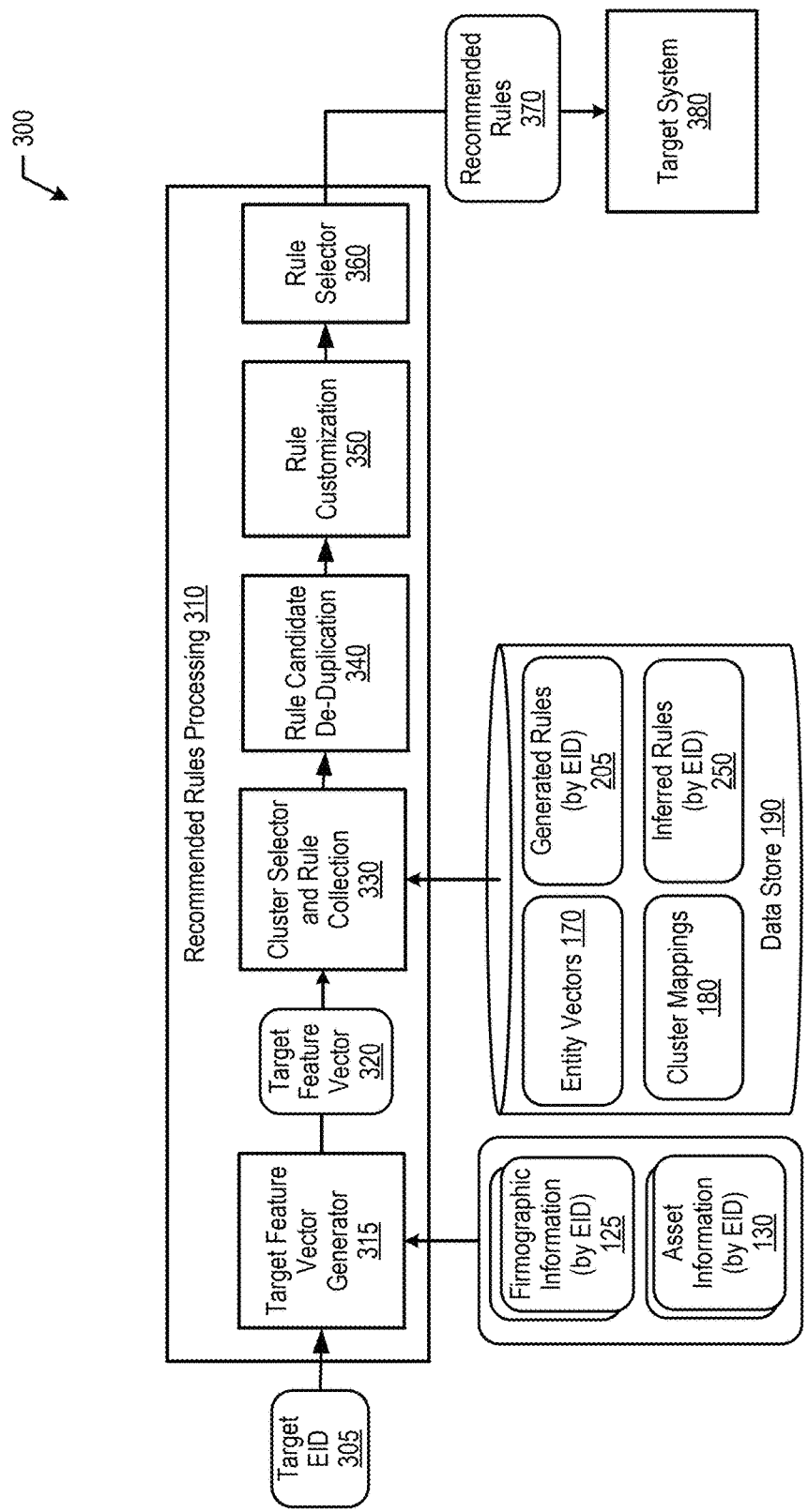
FIG. 3 is a block diagram that illustrates an example system that generates recommended rules for a target system, in accordance with some embodiments of the present disclosure.

FIG. 3 is a block diagram that illustrates an example system that generates recommended rules for a target system, in accordance with some embodiments of the present disclosure.

System 300 includes recommended rules processing 310, which receives target EID 305 that corresponds to a target entity of target system 380. Target feature vector generator 315 uses firmographic information 125 and asset information 130 to generate target feature vector 320 similar to that of vector generator 165 shown in FIG. 1 and discussed above.

Cluster selector and rule collection 330 matches target feature vector 320 to a corresponding entity cluster based on cluster mappings 180. Then, cluster selector and rule collection 330 matches target feature vector 320 with cluster information in cluster mappings 180 (e.g., via k-means clustering) to identify the closest cluster (compatible entity cluster). Then, cluster selector and rule collection 330 retrieves a portion of generated rules 205 and inferred rules 250 that correspond to current entity systems within the compatible entity cluster. For example, if target feature vector 320 corresponds to a large financial institution, cluster selector and rule collection 330 determines the corresponding large financial institution cluster and retrieves generated rules 205 and inferred rules 250 that were generated by other large financial institutions within the cluster.

Rules may include multiple fields such as tags, asset roles, platform, etc. and corresponding values. Rules are considered duplicates if they have the same fields and all fields in them have similar values. Rule candidate de-duplication 340 checks for rules that are implicit duplicates (e.g., rules that are semantically different but impact the same assets), and removes them accordingly.

In one embodiment, rule candidate de-duplication 340 computes similarity scores to identify similar rules using, for example, string literals, custom strings, or a combination thereof. String literals are strings from a drop-down menu such as platform name or vendor. Rule candidate de-duplication 340 compare values directly along with operation (==, !=) to identify duplicates. Custom Strings include fields such as asset tags that are highly indicative of the role of the asset, but can vary from entity to entity. Rule candidate de-duplication 340 performs approximate matching of tags which can be done with fuzzy matching of strings. However, tags that use abbreviations or domain specific synonyms are hard to compare using such logic or ML. Expert created mappings such as 'prod'~'production' or 'stage'~'staging' may supplement the approach. In addition, rule candidate de-duplication 340 ignores entity specific keywords that are present in a tag by only considering tokens that are present in at least two other EIDs. Rule candidate de-duplication 255 may also remove PII (Personally Identifiable Information) from the tags.

In one embodiment, rule candidate de-duplication 340 computes a similarity score for rules when entities are given the option to mark rules as not relevant to them. The similarity score may be used to ensure rules very similar to ones rejected by the entities are not recommended. Rule candidate de-duplication 340 computes a score representing rule similarity using the same approaches described above. Then, a similarity score is initialized to 0 and then updated based on comparison of each field as follows:

a. For identical string literals the score is incremented by 1 and for mismatch it is decremented by 1.
b. For custom strings, if exact match or match by custom created mapping then increment by 1, otherwise add the cosine similarity of the embeddings (which ranges from −1 to 1) computed by the pre-trained model.
c. For time and numeric fields, if they match exactly then increment by 1, otherwise compute similarity=(intersection of ranges-difference in ranges)/range and add to overall similarity.

Rule candidate de-duplication 340 computes the similarity for each field and is weighted as follows before it is added to the overall similarity. In addition, the overall similarity is divided by the total number of fields in the rules, which ensures that $-1<=$overall similarity$<=1$, where a weight of a field=(K+Number of rules using the field)/(K+Total number of rules).

Rule customization 350 receives rule candidates from rule candidate de-duplication 340. In one embodiment, the rule candidate may not be directly applicable to target EID 305, the tags may not match, or an IP prefix may be different. Rule customization 350 may update the rule candidate tags accordingly to find the nearest matching tags corresponding to target EID 305. In case there are multiple matching tags that are equally likely (similar occurrence count), then rule customization 350 may generate multiple customized rules. Rule customization 350 may update the IP prefix using subject matter expertise such that public IPs in rules will apply to public IP prefixes in target EID 305, and customized rules that have zero coverage in target EID 305 are ignored. Rule customization 350 then passes the remaining rules to rule selector 360.

Rule selector 360 uses a rule selection algorithm to refine the candidate rules received from rule customization 260 to produce recommended rules 370. For example, rule selector 360 may receive 50 candidate rules and refine the rules to recommend the top 5 rules based on various parameters. In one embodiment, safeguards are added to ignore "bad" rules that result from rule customization 350 changing the filters to be ineffective, too generic, or from other current entity systems attempting to generate rules that are unvalidated. Unvalidated can be filtered out to an extent by checking asset coverage on the entity and ignore the rule of the entity's asset coverage is too low (e.g., used on a few assets). In some embodiments, rule selector 360 selects rules where the deviation in coverage observed in the source EID and target EID 305 is minimal. Rule selector 265 may also select rules that were not rejected by, or received bad feedback from, a similar EID. For example, to select the top K rules, rule selector 360 may perform the following optimization (e.g., a knapsack problem): Select K of N rules such that the sum of weighted coverage of selected rules is maximized; while the sum of deviation in coverage<threshold C1; and the sum of similarity of previous rejected rules<threshold C2; and the sum of critical assets with rules<threshold C3.

In one embodiment, precedence may not be considered in this formulation and there is no ordering or rules. The ordering may be imposed on the resulting selection to follow precedence, such as the rules with a greater number of conditions can be given higher precedence. In one embodiment, rule selector 360 provides a confidence level for each of the rules included in recommended rules 370.

Target system 380 receives recommended rules 270 and may perform a variety of actions with recommended rules 370. For example, in one embodiment, target system 380 may identify target assets that meet recommended rules 370 and recommend to a user to add a "HIGH" label to the identified assets. In another embodiment, target system 380 may identify the target assets that meet recommended rules 370 and automatically add a "HIGH" label to the identified assets.

Figure 4:
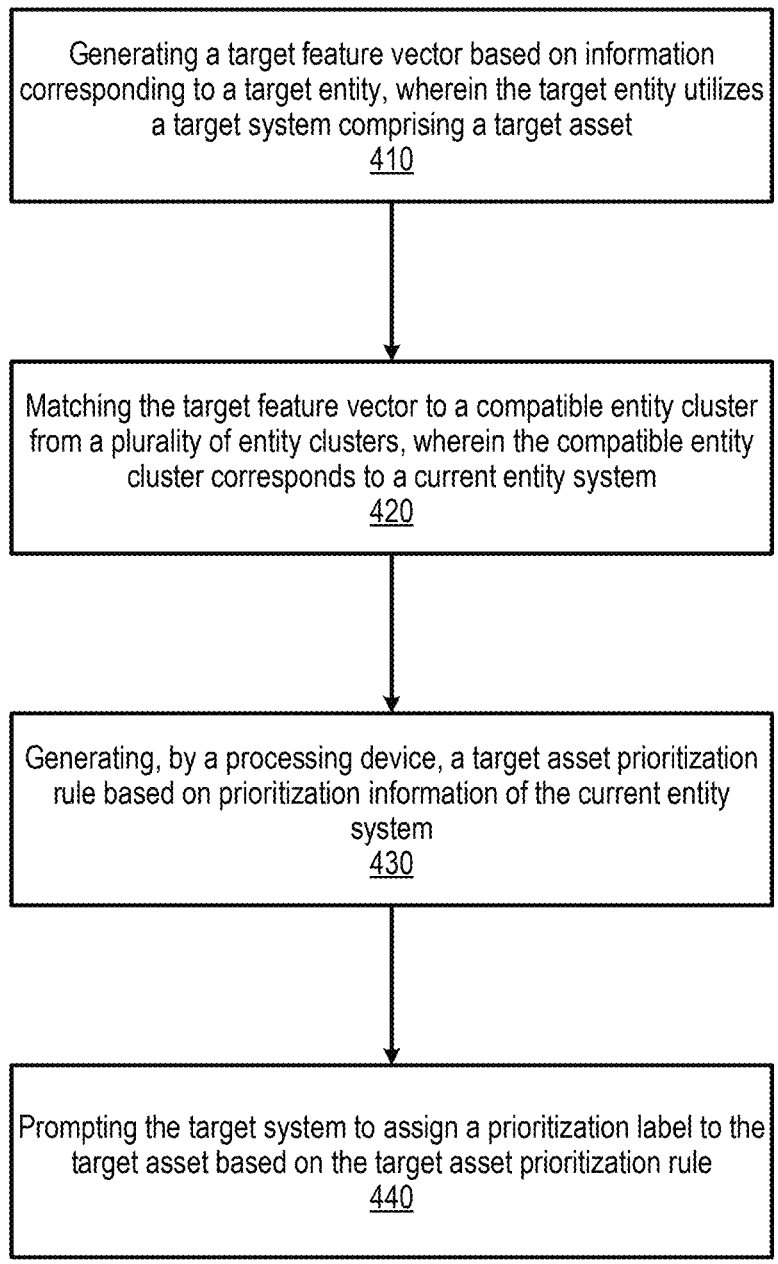
FIG. 4 is a flow diagram of a method 400 for generating target asset prioritization rules, in accordance with some embodiments.

FIG. 4 is a flow diagram of a method 400 for generating asset prioritization rules, in accordance with some embodiments. Method 400 may be performed by processing logic that may include hardware (e.g., a processing device), software (e.g., instructions running/executing on a processing device), firmware (e.g., microcode), or a combination thereof. In some embodiments, at least a portion of method 400 may be performed by target feature vector generator 315 (shown in FIG. 3), processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, whereupon processing logic generates a target feature vector based on information corresponding to a target entity that utilizes a target system which includes a target asset.

At block 420, processing logic matches the target feature vector to a compatible entity cluster from multiple entity clusters. The compatible entity cluster corresponds to a current entity system.

At block 430, processing logic generates a target asset prioritization rule based on prioritization information of the current entity system.

At block 440, processing logic prompts the target system to assign a prioritization label to the target asset based on the target asset prioritization rule.

Figure 5:
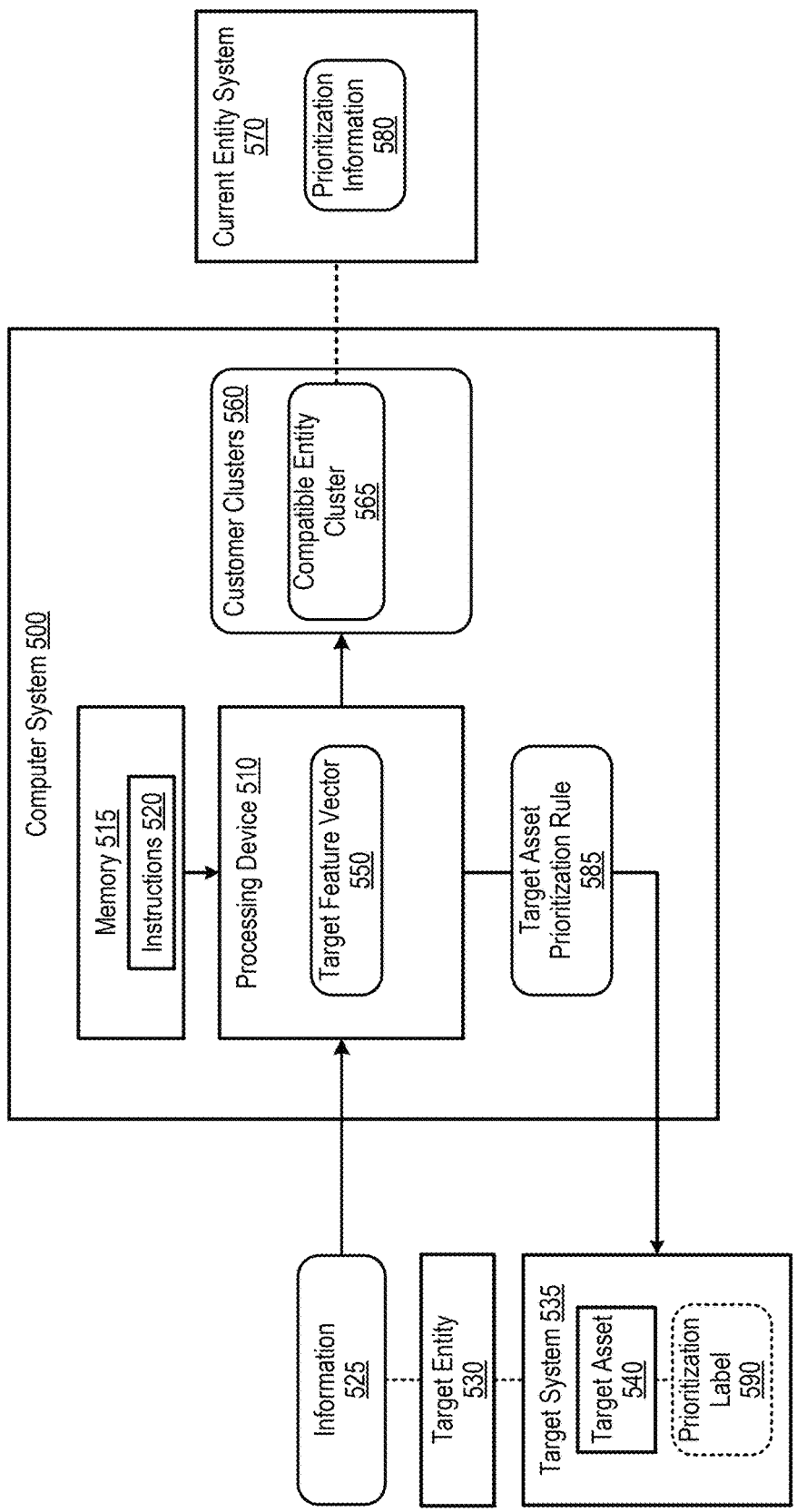
FIG. 5 is a block diagram that illustrates an example system for generating target asset prioritization rules, in accordance with some embodiments of the present disclosure.

FIG. 5 is a block diagram that illustrates an example system for generating asset prioritization rules, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to generate a target feature vector 550 based on information 525 corresponding to a target entity 530. Target entity 530 includes target system 535, which includes target asset 540.

Processing device 510 matches the target feature vector 550 to a compatible entity cluster 565 included in entity clusters 560. The compatible entity cluster 565 corresponds to current entity system 570. Processing device 510 generates a target asset prioritization rule 585 based on prioritization information 580 of current entity system 570. In turn, processing device 510 prompts target system 535 to assign a prioritization label 590 to target asset 540 based on target asset prioritization rule 585.

Figure 6:
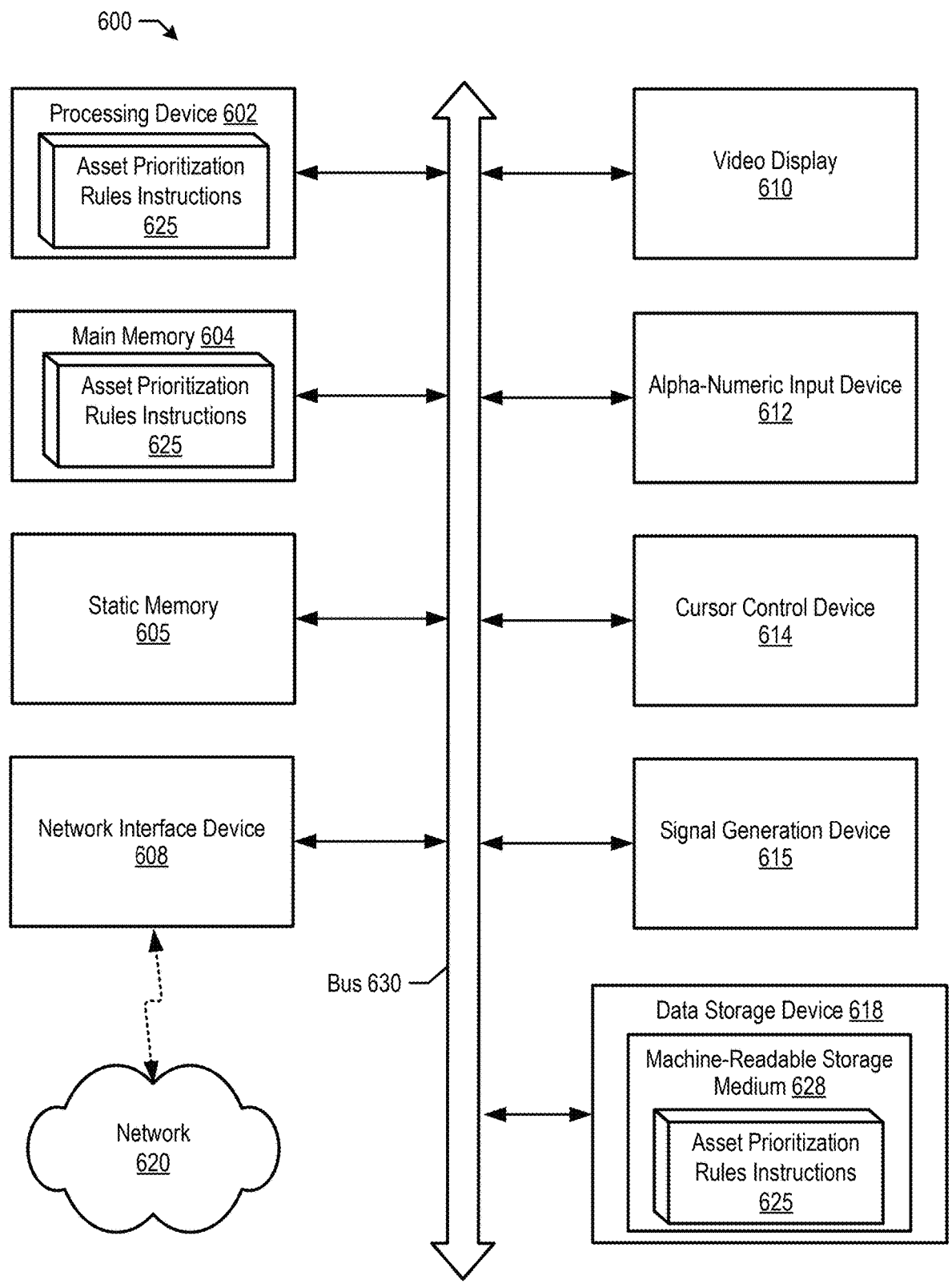
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for asset prioritization rules generation.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute asset prioritization rules instructions 625, for performing the operations and steps discussed herein.

The data storage device 618 may include a machine-readable storage medium 628, on which is stored one or more sets of asset prioritization rules instructions 625 (e.g., software) embodying any one or more of the methodologies of functions described herein. The asset prioritization rules instructions 625 may also reside, completely or at least partially, within the main memory 604 or within the processing device 602 during execution thereof by the computer system 600; the main memory 604 and the processing device 602 also constituting machine-readable storage media. The asset prioritization rules instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "generating," "matching," "prompting," "collecting," "formatting," "providing," "producing," "utilizing," "mapping," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
generating a target feature vector based on information comprising firmographic information corresponding to a target business entity, wherein the target business entity utilizes a target system comprising a target asset;
matching the target feature vector to a compatible entity cluster from a plurality of entity clusters, wherein the compatible entity cluster corresponds to a current business entity system;
collecting, from prioritization information of the current business entity system, an assigned asset tag and an assigned prioritization label;
formatting the assigned asset tag and the assigned prioritization label into an assigned asset tag embedding and an assigned prioritization label embedding;
generating an inferred rule from the assigned asset tag embedding and the assigned prioritization label embedding;
in response to the matching the target feature vector to the compatible entity cluster, generating, by a processing device, a target asset prioritization rule based on prioritization information of the current business entity system; and
prompting the target system to assign a prioritization label to the target asset based on the target asset prioritization rule.

2. The method of claim 1, wherein the generating the inferred rule further comprises:
providing the assigned asset tag embedding and the assigned prioritization label embedding to an artificial intelligence (AI) model that is trained to produce readable prioritization rules; and
producing, by the processing device using the AI model, the inferred rule.

3. The method of claim 1, further comprising:
collecting, from the prioritization information, a generated rule that corresponds to the current business entity system; and
in response to the matching the target feature vector to the compatible entity cluster, utilizing the generated rule in the generating of the target asset prioritization rule.

4. The method of claim 1, further comprising:
collecting the firmographic information and asset information corresponding to a plurality of entities;
generating a plurality of entity vectors based on the firmographic information and the asset information; and
mapping the plurality of entity vectors to produce the plurality of entity clusters.

5. The method of claim 1, wherein the target asset prioritization rule comprises an asset tag corresponding to the target asset and the prioritization label indicates a priority at which to protect the target asset against malware.

6. The method of claim 1, wherein the information comprises asset information, the firmographic information comprising at least one of an industry type, an entity size, or an entity location, and the asset information comprising at least one of an asset type or an asset quantity.

7. A system comprising:
a processing device; and
a memory to store instructions that, when executed by the processing device, cause the processing device to:
generate a target feature vector based on information comprising firmographic information corresponding to a target business entity, wherein the target business entity utilizes a target system comprising a target asset;
match the target feature vector to a compatible entity cluster from a plurality of entity clusters, wherein the compatible entity cluster corresponds to a current business entity system;
collect, from prioritization information of the current business entity system, an assigned asset tag and an assigned prioritization label;
format the assigned asset tag and the assigned prioritization label into an assigned asset tag embedding and an assigned prioritization label embedding;
generate an inferred rule from the assigned asset tag embedding and the assigned prioritization label embedding;
in response to the matching the target feature vector to the compatible entity cluster, generate a target asset prioritization rule based on prioritization information of the current business entity system; and
prompt the target system to assign a prioritization label to the target asset based on the target asset prioritization rule.

8. The system of claim 7, wherein the processing device is further to:
provide the assigned asset tag embedding and the assigned prioritization label embedding to an artificial intelligence (AI) model that is trained to produce readable prioritization rules; and
produce, by the processing device using the AI model, the inferred rule.

9. The system of claim 7, wherein the processing device is further to:
collect, from the prioritization information, a generated rule that corresponds to the current business entity system; and
in response to the matching the target feature vector to the compatible entity cluster, utilize the generated rule in the generating of the target asset prioritization rule.

10. The system of claim 7, wherein the processing device is further to:
collect the firmographic information and asset information corresponding to a plurality of entities;
generate a plurality of entity vectors based on the firmographic information and the asset information; and
map the plurality of entity vectors to produce the plurality of entity clusters.

11. The system of claim 7, wherein the target asset prioritization rule comprises an asset tag corresponding to the target asset and the prioritization label indicates a priority at which to protect the target asset against malware.

12. The system of claim 7, wherein the information comprises asset information, the firmographic information comprising at least one of an industry type, an entity size, or an entity location, and the asset information comprising at least one of an asset type or an asset quantity.

13. A non-transitory computer readable medium, having instructions stored thereon which, when executed by a processing device, cause the processing device to:
generate a target feature vector based on information comprising firmographic information corresponding to a target business entity, wherein the target business entity utilizes a target system comprising a target asset;

match the target feature vector to a compatible entity cluster from a plurality of entity clusters, wherein the compatible entity cluster corresponds to a current business entity system;

collect, from prioritization information of the current business entity system, an assigned asset tag and an assigned prioritization label;

format the assigned asset tag and the assigned prioritization label into an assigned asset tag embedding and an assigned prioritization label embedding;

generate an inferred rule from the assigned asset tag embedding and the assigned prioritization label embedding;

in response to the matching the target feature vector to the compatible entity cluster, generate, by the processing device, a target asset prioritization rule based on prioritization information of the current business entity system; and prompt the target system to assign a prioritization label to the target asset based on the target asset prioritization rule.

14. The non-transitory computer readable medium of claim 13, wherein the processing device is further to:

provide the assigned asset tag embedding and the assigned prioritization label embedding to an artificial intelligence (AI) model that is trained to produce readable prioritization rules; and produce, by the processing device using the AI model, the inferred rule.

15. The non-transitory computer readable medium of claim 13, wherein the processing device is further to:

collect, from the prioritization information, a generated rule that corresponds to the current business entity system; and in response to the matching the target feature vector to the compatible entity cluster, utilize the generated rule in the generating of the target asset prioritization rule.

16. The non-transitory computer readable medium of claim 13, wherein the processing device is further to:

collect the firmographic information and asset information corresponding to a plurality of entities;

generate a plurality of entity vectors based on the firmographic information and the asset information; and map the plurality of entity vectors to produce the plurality of entity clusters.

17. The non-transitory computer readable medium of claim 13, wherein the target asset prioritization rule comprises an asset tag corresponding to the target asset and the prioritization label indicates a priority at which to protect the target asset against malware.

\* \* \* \* \*